L. CUTTING.
Soldering-Tools.

No. 136,367. Patented March 4, 1873.

Witnesses.
Philip Mahler
W. Anthony

Lewis Cutting
By C. W. M. Smith
Atty.

UNITED STATES PATENT OFFICE.

LEWIS CUTTING, OF SAN FRANCISCO, CALIFORNIA.

IMPROVEMENT IN SOLDERING-TOOLS.

Specification forming part of Letters Patent No. 136,367, dated March 4, 1873.

*To all whom it may concern:*

Be it known that I, LEWIS CUTTING, of the city and county of San Francisco, State of California, have invented certain new and useful Improvements in Soldering-Tools; and I do hereby declare the following to be a full, clear, and exact description of the same, reference being had to the accompanying drawing forming a part of this specification.

My invention relates to certain improvements in the soldering-tools which are employed for sealing cans, such as are used for putting up fruit, &c.; and it consists, first, in a novel construction of the soldering-block, which is made in two pieces in order to allow the working part to be cheaply renewed when burned out or destroyed by the acid; and, secondly, in the use of an independent ferrule or ring, which is made adjustable to suit the groove, while a slit is made at one side of the bottom, by which the gases are allowed to escape and the flow of the solder is equalized.

Figure 1:
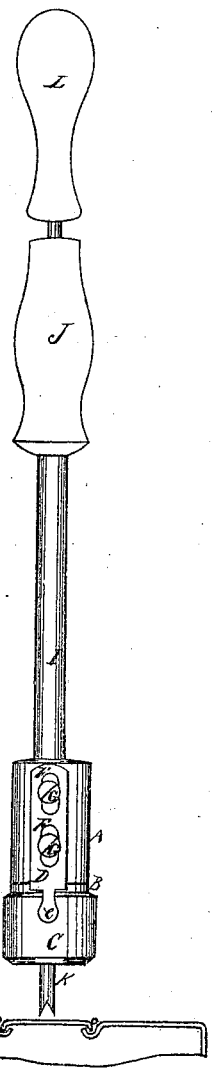
Figure 2:
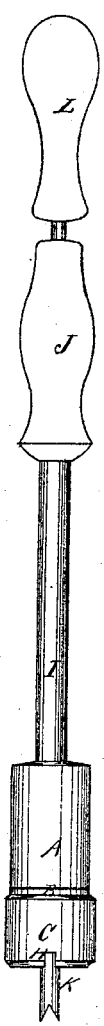
Figure 3:
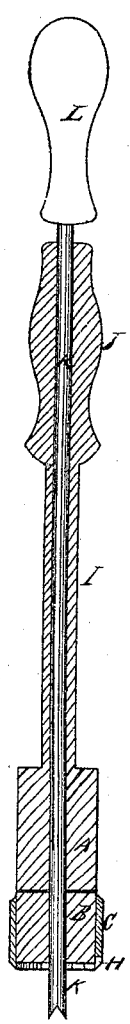

Referring to the accompanying drawing for a more complete explanation of my invention, Figure 1 is a longitudinal or side view of my improved iron, showing the adjusting device for the ferrule. Fig. 2 is a side view, showing the equalizing-slit. Fig. 3 is a longitudinal section of my iron.

The soldering-block is made in two pieces, A and B, united in any suitable manner, (not shown,) so that the lower part, which is always the most heated and subjected to the action of the acid used for soldering, can be easily removed and renewed whenever destroyed or rendered useless. Outside of the part B of the block is placed a ferrule, C, which forms the flange, which enters the groove in the can to melt the solder and secure the cover. This ferrule has a species of dovetailed groove made in one side, as shown, or it is fitted in any suitable manner, to receive an up-and-down motion from the slide D. This slide extends up along the side of the block A in the present case, and has its lower end made to fit the dovetailed slot, as shown at e, so that when the slide is simply loosened the ferrule can be removed. The slide D has elongated slots F made in it, and screws G, passing through these slots, serve to secure the slide firmly to the block A, and also to adjust the ferrule to any desired position for a greater or less depth of groove in the can-top. At one side of the lower edge of the ferrule is made a small slip, H, which serves to allow the escape of any gas or vapor which may be generated in the process of soldering, and also as a carrier, which causes the solder to flow equally when the block is turned around, which is its principal use. A hollow stem, I, extends upward, and has the handle J attached to it for turning the block. A rod, K, extends through this hollow handle, and its lower end serves to hold the cover down while being soldered, a handle, L, being also secured to its upper end.

By this construction I am enabled to keep the ferrule in order by a little filing, instead of being obliged to turn off the lower end of the block, as must be done when the block is made solid. I am also enabled to renew the lower part B of the block when burned or destroyed by acid with but little expense, and the slit in the ferrule causes the solder to run freely, and thus seal the can evenly and securely every time.

Having thus described my invention, what I desire to secure by Letters Patent is—

1. The block or cylinder, when constructed with the two parts A and B, substantially as and for the purpose described.

2. The adjustable ferrule C, when constructed and operated substantially as and for the purpose described.

3. The block or ferrule, when provided with the slit H for equalizing the flow of solder, substantially as herein described.

In witness whereof I have hereunto set my hand and seal.

LEWIS CUTTING. [L. S.]

Witnesses:
C. W. M. SMITH,
PHILIP MAHLER,
A. G. ANTHONY.